US005744797A

United States Patent [19]

Park

[11] Patent Number: 5,744,797

[45] Date of Patent: Apr. 28, 1998

[54] SPLIT-FIELD INTERFACE

[75] Inventor: Melvin Park, Nashua, N.H.

[73] Assignee: Bruker Analytical Instruments, Inc., Billerica, Mass.

[21] Appl. No.: 561,634

[22] Filed: Nov. 22, 1995

[51] Int. Cl.[6] .............................. B01D 59/44; H01J 49/00

[52] U.S. Cl. .............................. 250/287; 250/281

[58] Field of Search .............................. 250/281, 287

[56] References Cited

U.S. PATENT DOCUMENTS

| | | | |
|---|---|---|---|
| 2,938,116 | 5/1960 | Benson et al. | 250/287 |
| 3,986,111 | 10/1976 | Sellers | 250/287 |
| 5,070,240 | 12/1991 | Lee et al. | 250/287 |
| 5,117,107 | 5/1992 | Guilhaus et al. | 250/287 |
| 5,496,998 | 3/1996 | Bergmann | 250/287 |

*Primary Examiner*—Bruce Anderson
*Attorney, Agent, or Firm*—Ward & Olivo

[57] ABSTRACT

A method and apparatus to accelerate ions using two or more electric fields which are spatially separated. Electric fields are used to accelerate ions. With electric fields of the proper strength and geometry, ions may be space focused so that ions of a given mass-to-charge arrive at a virtual object plane simultaneously. According to the present invention, a split field interface, in the form of a set of biased electrodes, is used to produce and adjust the position of a virtual object plane.

19 Claims, 7 Drawing Sheets

FIG. 2A
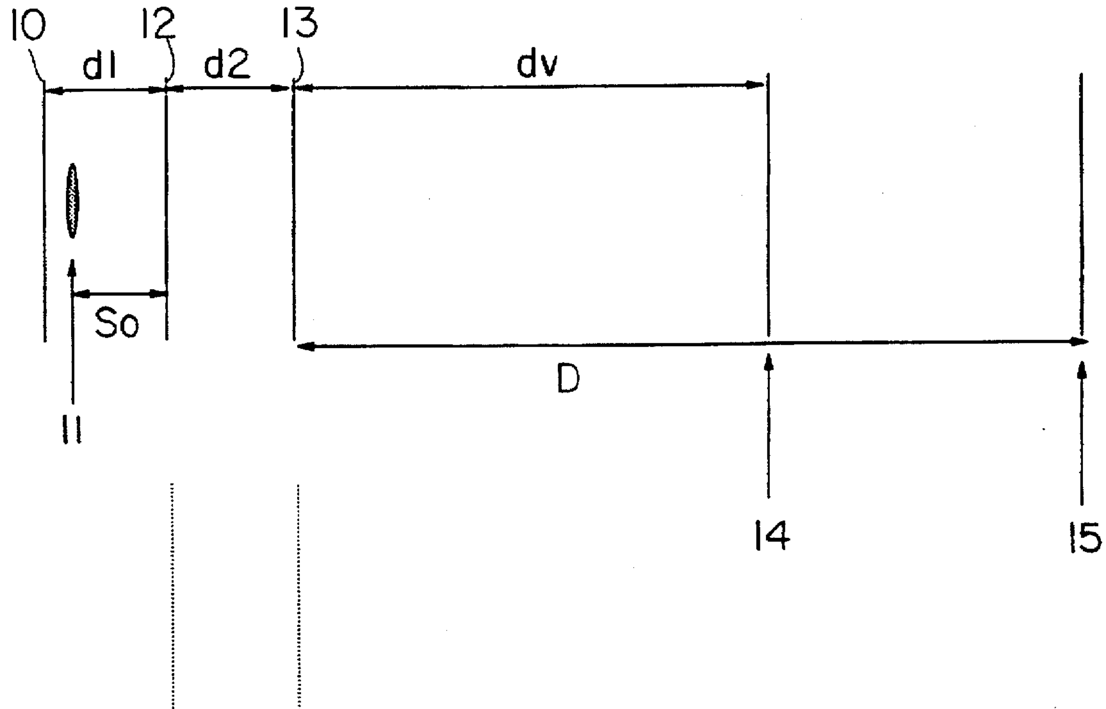
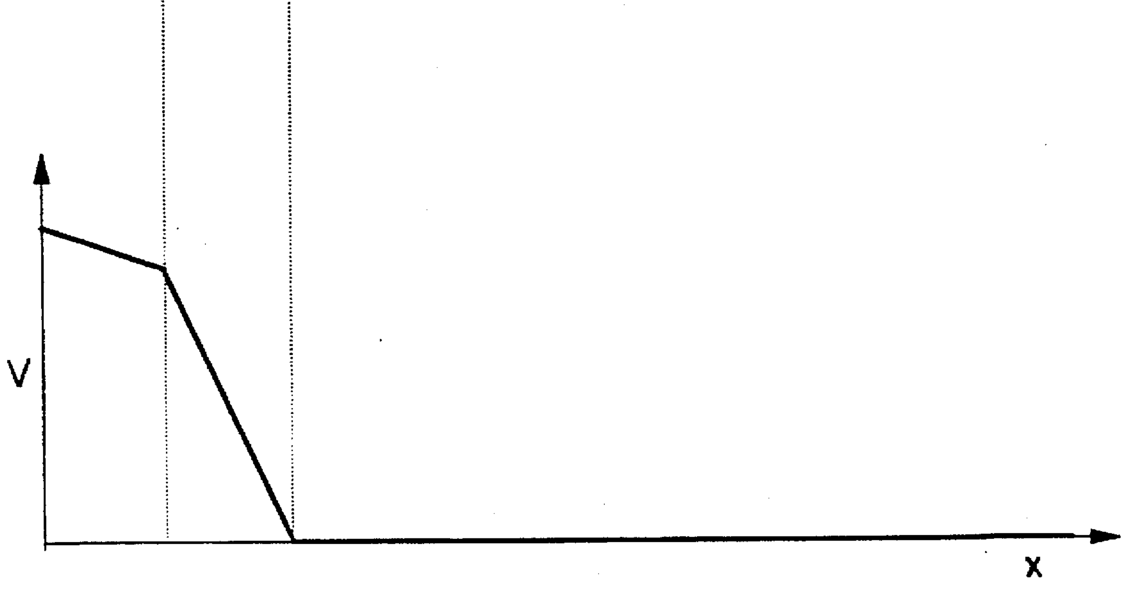
FIG. 2B

FIG. 5A
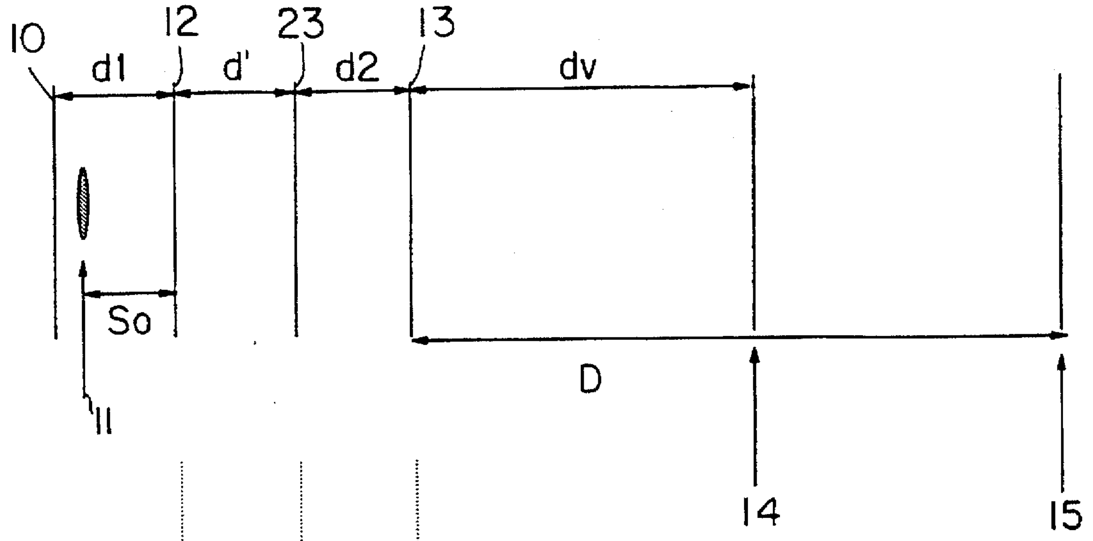
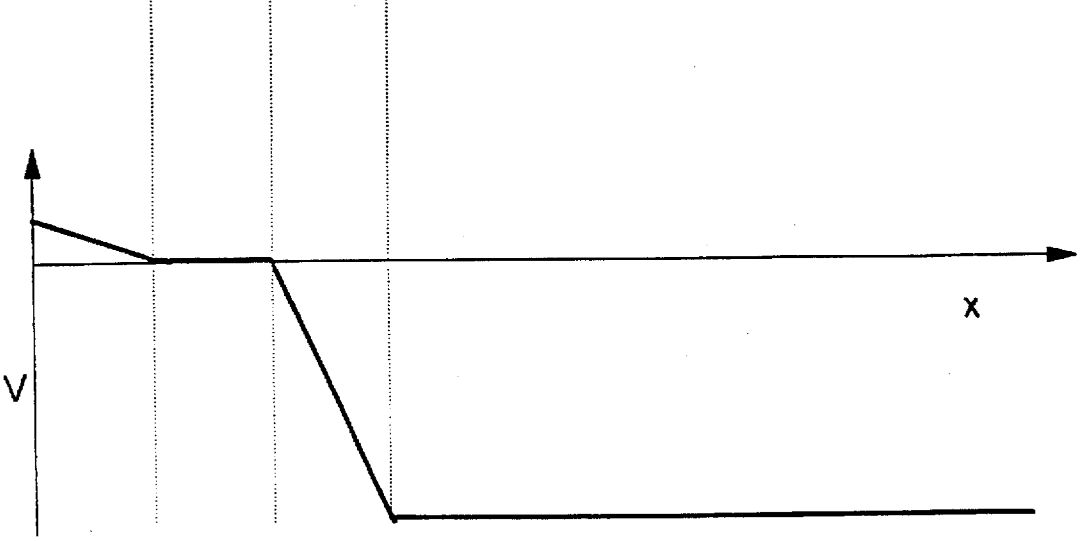
FIG. 5B

FIG. 7A
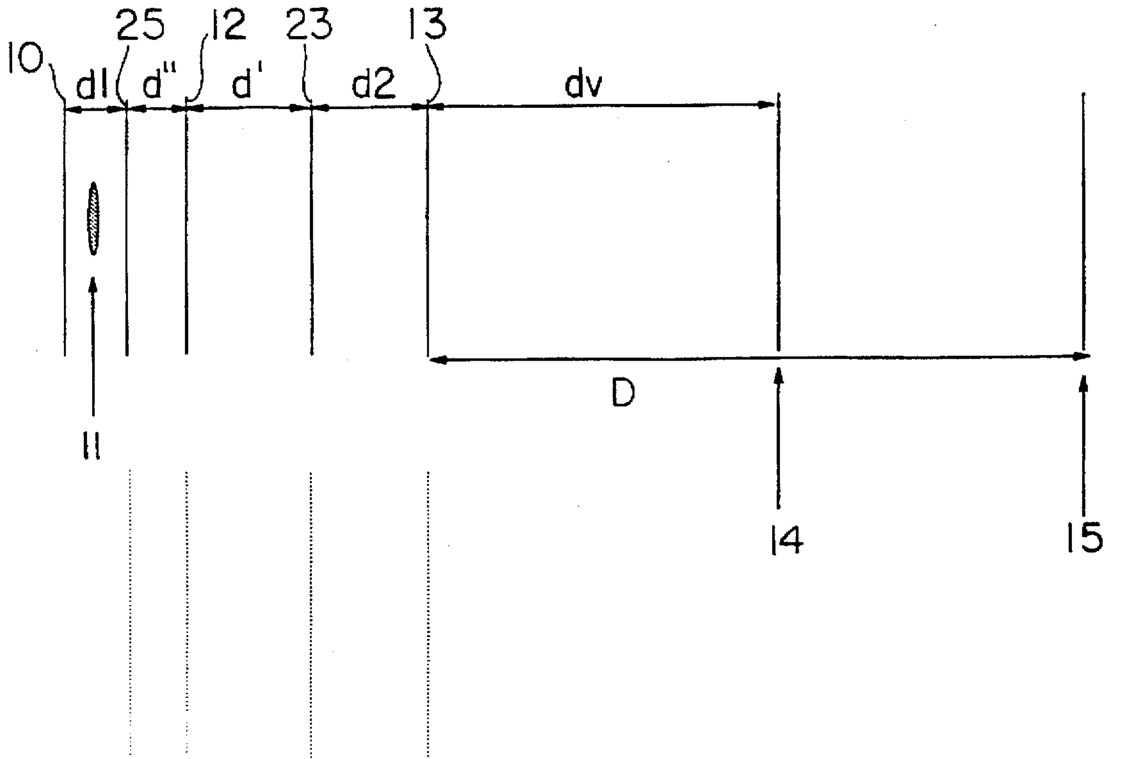
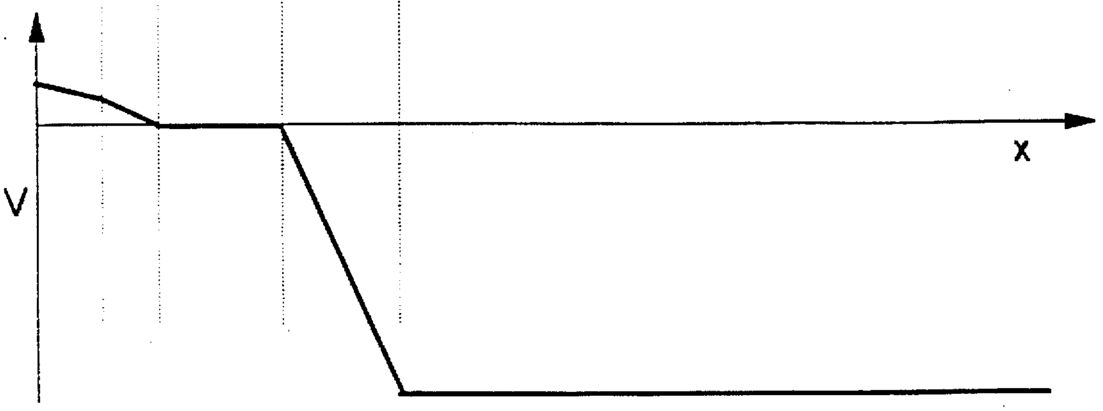
FIG. 7B

SPLIT-FIELD INTERFACE

TECHNICAL FIELD

This invention relates generally to ion beam handling and more particularly to a means for accelerating ions in time-of-flight mass spectrometry.

BACKGROUND ART

This invention relates in general to ion beam handling in mass spectrometers and more particularly to a means of accelerating ions in time-of-flight mass spectrometers (TOFMS). The apparatus and method of mass analysis described herein is an enhancement of the techniques that are referred to in the literature relating to mass spectrometry.

The analysis of ions by mass spectrometers is important, as mass spectrometers are instruments that are used to determine the chemical structures of molecules. In these instruments, molecules become positively or negatively charged in an ionization source and the masses of the resultant ions are determined in vacuum by a mass analyzer that measures their mass/charge (m/z) ratio. Mass analyzers come in a variety of types, including magnetic field (B), combined (double-focusing) electrical (E) and magnetic field (B), quadrupole (Q), ion cyclotron resonance (ICR), quadrupole ion storage trap, and time-of-flight (TOF) mass analyzers, which are of particular importance with respect to the invention disclosed herein. Each mass spectrometric method has a unique set of attributes. Thus, TOFMS is one mass spectrometric method that arose out of the evolution of the larger field of mass spectrometry.

The analysis of ions by TOFMS is, as the name suggests, based on the measurement of the flight times of ions from an initial position to a final position. Ions which have the same initial kinetic energy but different masses will separate when allowed to drift through a field free region.

Ions are conventionally extracted from an ion source in small packets. The ions acquire different velocities according to the mass-to-charge ratio of the ions. Lighter ions will arrive at a detector prior to high mass ions. Determining the time-of-flight of the ions across a propagation path permits the determination of the masses of different ions. The propagation path may be circular or helical, as in cyclotron resonance spectrometry, but typically linear propagation paths are used for TOFMS applications.

TOFMS is used to form a mass spectrum for ions contained in a sample of interest. Conventionally, the sample is divided into packets of ions that are launched along the propagation path using a pulse-and-wait approach. In releasing packets, one concern is that the lighter and faster ions of a trailing packet will pass the heavier and slower ions of a preceding packet. Using the traditional pulse-and-wait approach, the release of an ion packet as timed to ensure that the ions of a preceding packet reach the detector before any overlap can occur. Thus, the periods between packets is relatively long. If ions are being generated continuously, only a small percentage of the ions undergo detection. A significant amount of sample material is thereby wasted. The loss in efficiency and sensitivity can be reduced by storing ions that are generated between the launching of individual packets, but the storage approach carries some disadvantages.

Resolution is an important consideration in the design and operation of a mass spectrometer for ion analysis. The traditional pulse-and-wait approach in releasing packets of ions enables resolution of ions of different masses by separating the ions into discernible groups. However, other factors are also involved in determining the resolution of a mass spectrometry system. "Space resolution" is the ability of the system to resolve ions of different masses despite an initial spatial position distribution within an ion source from which the packets are extracted. Differences in starting position will affect the time required for traversing a propagation path. "Energy resolution" is the ability of the system to resolve ions of different mass despite an initial velocity distribution. Different starting velocities will affect the time required for traversing the propagation path.

In addition, two or more mass analyzers may be combined in a single instrument to form a tandem mass spectrometer (MS/MS, MS/MS/MS, etc.). The most common MS/MS instruments are four sector instruments (EBEB or BEEB), triple quadrupoles (QQQ), and hybrid instruments (EBQQ or BEQQ). The mass/charge ratio measured for a molecular ion is used to determine the molecular weight of a compound. In addition, molecular ions may dissociate at specific chemical bonds to form fragment ions. Mass/charge ratios of these fragment ions are used to elucidate the chemical structure of the molecule. Tandem mass spectrometers have a particular advantage for structural analysis in that the first mass analyzer (MS1) can be used to measure and select molecular ion from a mixture of molecules, while the second mass analyzer (MS2) can be used to record the structural fragments. In tandem instruments, a means is provided to induce fragmentation in the region between the two mass analyzers. The most common method employs a collision chamber filled with an inert gas, and is known as collision induced dissociation CID. Such collisions can be carried out at high (5–10 keV) or low (10–100 eV) kinetic energies, or may involve specific chemical (ion-molecule) reactions. Fragmentation may also be induced using laser beams (photodissociation), electron beams (electron induced dissociation), or through collisions with surfaces (surface induced dissociation). It is possible to perform such an analysis using a variety of types of mass analyzers including TOF mass analysis.

In a TOFMS instrument, molecular and fragment ions formed in the source are accelerated to a kinetic energy:

$$eV=\frac{1}{2}mv^2 \quad (1)$$

where e is the elemental charge, V is the potential across the source/accelerating region, m is the ion mass, and v is the ion velocity. These ions pass through a field-free drift region of length L with velocities given by equation 1. The time required for a particular ion to traverse the drift region is directly proportional to the square root of the mass/charge ratio:

$$t=L\sqrt{\frac{m}{2eV}} \quad (2)$$

Conversely, the mass/charge ratios of ions can be determined from their flight times according to the equation:

$$m/e=at^2+b \quad (3)$$

where a and b are constants which can be determined experimentally from the flight times of two or more ions of known mass/charge ratios.

Generally, TOF mass spectrometers have limited mass resolution. This arises because there may be uncertainties in the time that the ions were formed (time distribution), in their location in the accelerating field at the time they were formed (spatial distribution), and in their initial kinetic energy distributions prior to acceleration (energy distribution).

The first commercially successful TOFMS was based on an instrument described by Wiley and McLaren in 1955 (Wiley, W. C.; McLaren, I. H., Rev. Sci. Instrumen. 26 1150 (1955)). That instrument utilized electron impact (EI) ionization (which is limited to volatile samples) and a method for spatial and energy focusing known as time-lag focusing. In brief, molecules are first ionized by a pulsed (1–5 microsecond) electron beam. Spatial focusing was accomplished using multiple-stage acceleration of the ions. In the first stage, a low voltage (−150 V) drawout pulse is applied to the source region that compensates for ions formed at different locations, while the second (and other) stages complete the acceleration of the ions to their final kinetic energy (−3 kev ). A short time-delay (1–7 microseconds) between the ionization and drawout pulses compensates for different initial kinetic energies of the ions, and is designed to improve mass resolution. Because this method required a very fast (40 ns) rise time pulse in the source region, it was convenient to place the ion source at ground potential, while the drift region floats at −3 kV. The instrument was commercialized by Bendix Corporation as the model NA-2, and later by CVC Products (Rochester, N.Y.) as the model CVC-2000 mass spectrometer. The instrument has a practical mass range of 400 daltons and a mass resolution of 1/300, and is still commercially available.

There have been a number of variations on this instrument. Muga (TOFTEC, Gainsville) has described a velocity compaction technique for improving the mass resolution (Muga velocity compaction). Chatfield et al. (Chatfield FT-TOF) described a method for frequency modulation of gates placed at either end of the flight tube, and Fourier transformation to the time domain to obtain mass spectra. This method was designed to improve the duty cycle.

Cotter et al. (VanBreeman, R. B.: Snow, M.: Cotter, R. J., Int. J. Mass Spectrom. Ion Phys. 49 (1983) 35.; Tabet, J. C.; Cotter, R. J., Anal. Chem. 56 (1984) 1662; Olthoff, J. K.; Lys, I.: Demirev, P.: Cotter, R. J., Anal. Instrumen. 16 (1987) 93, modified a CVC 2000 time-of-flight mass spectrometer for infrared laser desorption of involatile biomolecules, using a Tachisto (Needham, Mass.) model 215G pulsed carbon dioxide laser. This group also constructed a pulsed liquid secondary time-of-flight mass spectrometer (liquid SIMS-TOF) utilizing a pulsed (1–5 microsecond) beam of 5 keV cesium ions, a liquid sample matrix, a symmetric push/pull arrangement for pulsed ion extraction (Olthoff, J. K.; Cotter, R. J., Anal. Chem. 59 (1987) 999–1002.; Olthoff, J. K.; Cotter, R. J., Nucl. Instrum. Meth. Phys. Res. B-26 (1987) 566–570. In both of these instruments, the time delay range between ion formation and extraction was; extended to 5–50 microseconds, and was used to permit metastable fragmentation of large molecules prior to extraction from the source. This in turn reveals more structural information in the mass spectra.

The plasma desorption technique introduced by Macfarlane and Torgerson in 1974 (Macfarlane, R. D.; Skowronski, R. P.; Torgerson, D. F., Biochem. Biophys. Res Commoun. 60 (1974) 616.) formed ions on a planar surface placed at a voltage of 20 kV. Since there are no spatial uncertainties, ions are accelerated promptly to their final kinetic energies toward a parallel, grounded extraction grid, and then travel through a grounded drift region. High voltages are used, since mass resolution is proportional to U o /;eV, where the initial kinetic energy, U 0 / is of the order of a few electron volts. Plasma desorption mass spectrometers have been constructed at Rockefeller (Chait, B. T., Field, F. H., J. Amer. Chem. Soc. 106 (1984) 1.93, (Orsay (LeBeyec, Y.; Della Negra, S.; Deprun, C.; Vigny, P.; Giont, Y. M., Rev. Phys. Appl 15 (1980) 1631), Paris (Viari, A.; Ballini, J. P.; Vigny, P.; Shire, D.; Dousset, P., Biomed. Environ. Mass Spectrom, 14 (1987) 83), Upsalla (Hakansson, P.; Sundqvist B., Radiat. Eff. 61 (1982) 179) and Darmstadt (Becker, O.; Furstenau, N.; Krueger, F. R.; Weiss, G.; Wein, K., Nucl. Instrum. Methods 139 (1976) 195). A plasma desorption time-of-flight mass spectrometer has bee commercialized by BIO-ION Nordic (Upsalla, Sweden). Plasma desorption utilizes primary ion particles with kinetic energies in the MeV range to induce desorption/ionization. A similar instrument was constructed at Manitobe (Chain, B. T.; Standing, K. G., Int. J. Mass Spectrum. Ion Phys. 40 (1981) 185) using primary ions in the keV range, but has not been commercialized.

Matrix-assited laser desorption, introduced by Tanaka et al. (Tanaka, K.; Waki, H.; Ido, Y.; Akita, S.; Yoshida, Y.; Yoshica, T., Rapid Commun. Mass Spectrom. 2 (1988) 151) and by Karas and Hillenkamp (Karas, M.; Hillenkamp, F., Anal. Chem. 60 (1988) 2299) utilizes TOFMS to measure the molecular weights of proteins in excess of 100,000 daltons. An instrument constructed at Rockefeller (Beavis, R. C.; Chait, B. T., Rapid Commun. Mass Spectrom. 3 (1989) 233) has been commercialized by VESTEC (Houston, Tex.), and employs prompt two-stage extraction of ions to an energy of 30 keV.

Time-of-flight instruments with a constant extraction field have also been utilized with multi-photon ionization, using short pulse lasers.

The instruments described thus far are linear time-of-flights, that is: there is no additional focusing after the ions are accelerated and allowed to enter the drift region. Two approaches to additional energy focusing have been utilized: those which pass the ion beam through an electrostatic energy filter.

The reflectron (or ion mirror) was first described by Mamyrin (Mamyrin, B. A.; Karatajev. V. J.; Shmikk, D. V.; Zagulin, V. A., Sov. Phys., JETP 37 (1973) 45). At the end of the drift region, ions enter a retarding field from which they are reflected back through the drift region at a slight angle. Improved mass resolution results from the fact that ions with larger kinetic energies must penetrate the reflecting field more deeply before being turned around. These faster ions than catch up with the slower ions at the detector and are focused. Reflectrons were used on the laser microprobe instrument introduced by Hillenkamp et al. (Hillenkamp, F.; Kaufmann, R.; Nitsche, R.; Unsold, E., Appl. Phys. 8 (1975) 341) and commercialized by Leybold Hereaus as the LAMMA, (LAser Microprobe Mass Analyzer). A similar instrument was also commercialized by Cambridge Instruments as the IA ( Laser Ionization Mass Analyzer). Benninghoven (Benninghoven reflection) has described a SIMS (secondary ion mass spectrometer) instrument that also utilizes a reflectron, and is currently being commercialized by Leybold Hereaus. A reflecting SIMS instrument has also been constructed by Standing (Standing, K. G.; Beavis, R.; Bollbach, G.; Ens, W.; Lafortune, F.; Main, D.; Schueler,, B.; Tang, X.; Westmore, J. B., Anal. Instrumen. 16 (1987) 173).

Lebeyec (Della-Negra, S.; Lebeyec, Y., in Ion Formation from Organic Solids IFOS III, ed. by A. Benninghoven, pp 42–45, Springer-Verlag, Berlin (1986)) described a coaxial reflectron time-of-flight that reflects ions along the same path in the drift tube as the incoming ions, and records their arrival times on a channelplate detector with a centered hole that allows passage of the initial (unreflected) beam. This geometry was also utilized by Tanaka et al. (Tanaka, K.; Waki, H.; Ido, Y.; Akita, S.; Yoshida, T., Rapid Comun. Mass Spectrom. 2 (1988) 151) for matrix assisted laser desorption. Schlag et al. (Grotemeyer, J.; Schlag, E. W., Org. Mass Spectrom. 22 (1987) 758) have used a reflectron on a two-laser instrument. The first laser is used to ablate solid samples, while the second laser forms ions by multiphoton ionization. This instrument is currently available from Bruker. Wollnik et al. (Grix., R.; Kutscher, R.; Li, G.; Gruner, U.; Wolinik, H., Rapid Commun. Mass Spectrom. 2 (1988) 83) have described the use of reflectrons in combination with pulsed ion extraction, and achieved mass resolutions as high as 20,000 for small ions produced by electron impact ionization.

An alternative to reflectrons is the passage of ions through an electrostatic energy filter, similar to that used in double-focusing sector instruments. This approach was first described by Poschenroeder (Poschenroeder, W., Int. J. Mass Spectrom. Ion Phys. 6 (1971) 413). Sakurai et al. (Sakuri, T.; Fujita, Y; Matsuo, T.; Matsuda, H; Katakuse, I., Int. J. Mass Spectrom. Ion Processes 66 (1985) 283) have developed a time-of-flight instrument employing four electrostatic energy analyzers (ESA) in the time-of-flight path. At Michigan State, an instrument known as the ETOF was described that utilizes a standard ESA in the TOF analyzer (Michigan ETOF).

Lebeyec et al. (Della-Negra, S.; Lebeyec, Y., in Ion Formation from Organic Solids IFOS III, ed. by A. Benninghoven, pp 42–45, Springer-Verlag, Berlin (1986)) have described a technique known as correlated reflex spectra, which can provide information on the fragment ion arising from a selected molecular ion. In this technique, the neutral species arising from fragmentation in the flight tube are recorded by a detector behind the reflectron at the same flight time as their parent masses. Reflected ions are registered only when a neutral species is recorded within a preselected time window. Thus, the resultant spectra provide fragment ion (structural) information for a particular molecular ion. This technique has also been utilized by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

Although TOF mass spectrometers do not scan the mass range, but record ions of all masses following each ionization event, this mode of operation has some analogy with the linked scans obtained on double-focusing sector instrument. In both instruments, MS/MS information is obtained at the expense of high resolution. In addition correlated reflex spectra can be obtained only on instruments which record single ions on each TOF cycle, and are therefore not compatible with methods (such as laser desorption) which produce high ion currents following each laser pulse.

New ionization techniques, such as plasma desorption (Macfarlane, R. D.; Skowronski, R. P.; Torgerson, D. F.; Biochem. Bios. Res. Commun. 60 (1974) 616), laser desorption (VanBreemen, R. B.; Snow, M.; Cotter, R. J., Int. J. Mass Spectrom. Ion Phys. 49 (1983) 35; Van der Peyl, G. J. Q.; Isa, K.; Haverkamp, J.; Kistemaker, P. G., Org. Mass Spectrom. 16 (1981) 416), fast atom bombardment (Barber, M.; Bordoli, R. S.; Sedwick, R. D.; Tyler, A. N., J. Chem. Soc., Chem. Commun. (1981) 325–326) and electrospray (Meng, C. K.; Mann, M.; Fenn, J. B., Z. Phys. D10 (1988) 361), have made it possible to examine the chemical structures of proteins and peptides, glycopeptides, glycolipids and other biological compounds without chemical derivatization. The molecular weights of intact proteins can be determined using matrix assisted laser desorption ionization (MALDI) on a TOF mass spectrometer or electrospray ionization. For more detailed structural analysis, proteins are generally cleaved chemically using CNBr or enzymatically using trypsinor other proteases. The resultant fragments, depending upon size, can be mapped using MALDI, plasma desorption or fast atom bombardment. In this case, the mixture of peptide fragments (digest) is examined directly resulting in a mass spectrum with a collection of molecular ion corresponding to the masses of each of the peptides. Finally, the amino acid sequences of the individual peptides which make up the whole protein can be determined by fractionation of the digest, followed by mass spectral analysis of each peptide to observe fragment ions that correspond to its sequence.

It is the sequencing of peptides for which tandem mass spectrometry has its major advantages. Generally, most of the new ionization techniques are successful in producing intact molecular ions, but not in producing fragmentation. In a tandem instrument the first mass analyzer passes molecular ions corresponding to the peptide of interest. These ions are activated toward fragmentation in a collision chamber, and their fragmentation products are extracted and focused into the second mass analyzer which records a fragment ion (or daughter ion) spectrum.

A tandem TOFMS consists of two TOF analysis regions with an ion gate between the two regions. The ion gate allows one to gate (i.e. select) ions which will be passed from the first TOF analysis region to the second. As in conventional TOFMS, ions of increasing mass have decreasing velocities and increasing flight times. Thus, the arrival time of ions at the ion gate at the end of the first TOF analysis region is dependent on the mass-to-charge ratio of the ions. If one opens the ion gate only at the arrival time of the ion mass of interest, then only ions of that mass-to-charge will be passed into the second TOF analysis region.

However, it should be noted that the products of an ion dissociation that occurs after the acceleration of the ion to its final potential will have the same velocity as the original ion. The product ions will therefore arrive at the ion gate at the same time as the original ion and will be passed by the gate (or not) just as the original ion would have been.

The arrival times of product ions at the end of the second TOF analysis region is dependent on the product ion mass because a reflectron is used. As stated above, product ions have the same velocity as the reactant ions from which they originate. As a result, the kinetic energy of a product ion is directly proportional to the product ion mass. Because the flight time of an ion through a reflectron is dependent on the kinetic energy of the ion, and the kinetic energy of the product ions are dependent on their masses, the flight time of the product ions through the reflectron is dependent on their masses.

As TOFMS is a pulsed technique, one of the difficulties in its use is in interfacing it with continuous ion sources such as electrospray ionization. One common method for interfacing such a source with TOFMS is referred to as orthogonal acceleration. In this method, the TOF analysis is performed in a direction which is roughly orthogonal to the direction of motion of the ion beam produced by the source. The beam from the source passes into and through an interface region at the beginning of the TOF mass spectrometer. In the interface region, the ion beam passes between accelerating electrodes. By energizing the accelerating electrodes, the portion of the ion beam which is between the accelerating electrodes is accelerated such that a TOF mass analysis can be performed on these ions. Ideally, the accelerating electrodes are energized at regular intervals such that all the ions from the source are accelerated and analyzed.

One difficulty with the orthogonal acceleration method is that if the TOF direction is to be truly orthogonal to the direction of motion of the ion beam, the ions must be deflected using a deflector or similar device. This deflection must occur as near as possible to the point of origin of the ion beam to avoid losing control of the ions being analyzed.

An additional difficulty with orthogonal acceleration is associated with the starting position of the ions. In an orthogonal TOFMS instrument, ions are formed external to the interface. From the external ion source, ions are injected into the interface. However, due to this ion formation and injection process, each ion follows a slightly different path through the interface. Thus, each ion has a different starting position in the TOF analysis. As a result, each ion travels a different distance and therefore has a different flight time.

One solution to this problem is to form a "virtual object plane" via "space focusing". In order to accomplish this, one must adjust the geometry of the spectrometer and the strength of the electrostatic fields in the interface region as discussed below. However, the adjustment of the geometry of the elements in the interface region according to the prior art makes the deflection of the ions near their starting point difficult.

The purpose of the present invention is to achieve greater flexibility in the acceleration of ion beams and in the manipulation of ions in the ion acceleration region.

Several references relate to the technology herein disclosed. For example, F. Hillenkamp, M. Karas, R. C. Beavis, B. T. Chait, *Anal. Chem.* 63(24), 1193A(1991); Wei Hang, Pengyuan Yag, Xiaoru Wang, Chenglong Yang, Yongxuan Su, and Benli Huang, *Rapid Comm. Mass Spectrom.* 8, 590(1994); A. N. Verentchikov, W. Ens, K. G. Standing, *Anal. Chem.* 66, 126(1994); J. H. J. Dawson, M. Guilhaus, *Rapid Comm. Mass Spectrom.* 3, 155(1989); M. Guilhaus, *J. Am. Soc. Mass Spectrom.* 5, 588(1994); E. Axelsson, L. Holmlid, *Int. J. Mass Spectrom. Ion Process.* 59, 231(1984); O. A. Mirgorodskaya, et al., *Anal. Chem.* 66, 99(1994); S. M. Michael, B. M. Chien, D. M. Lubman, *Anal. Chem.* 65, 2614(1993); W. C. Wiley, I. H. McLaren, *Rev. Sci. Inst.* 26(12), 1150(1955).

SUMMARY OF THE INVENTION

In the analysis of samples by time-of-flight mass spectrometry (TOFMS), it is necessary to form gas phase ions from the sample material. If the sample material is already in the gas phase at the time of ionization, then additional problems in the analysis of the ions must be dealt with. In particular, if ions are formed from a solid surface such as in matrix assisted laser desorption ionization (MALDI), then the ions all have a unique starting position or "object plane". By measuring the time-of-flight of the ions from this object plane to the detection plane, one can determine the mass of these ions. However, as in orthogonal TOFMS, there is sometimes no well defined object plane. That is, the ions will be formed at a range of distances from the detection plane. Because of this, the flight times of the ions from the position at which they are formed to the detection plane is no longer a simple function of the ion mass.

In a prior art Wiley-McLaren design, the acceleration region includes two acceleration stages. By properly adjusting the electric field strength in these two acceleration stages, it is possible to focus the ions onto a virtual object plane which occurs at a predictable distance from the end of the acceleration region. During the TOF analysis, ions of a given mass all arrive at the virtual object plane at the same time. The electric field strengths may be adjusted so that the virtual object plane occurs close to the end of the acceleration region. In this case, the virtual object plane acts in essence as the ion origin for the TOFMS analysis. Alternatively, the electric field strengths may be adjusted such that the virtual object plane occurs at the detection plane. In this case, ions of a given mass-to-charge ratio all have nearly the same flight times despite differences in their initial positions.

In the prior art Wiley-McLaren design, the two acceleration stages are immediately adjacent to one another. So ions encounter the second acceleration stage immediately upon leaving the first acceleration stage. The present invention modifies the prior art Wiley-McLaren design such that the two acceleration stages are no longer adjacent. Rather, there is a gap between the two accelerating regions into which one might place other devices. With such a device, one may, for example, deflect the ions while they are still close to their starting position and before they've reached their final kinetic energy. Also, the virtual object plane may be formed closer to the interface under a given set of conditions with the split field interface than with the prior art Wiley-McLaren design.

Further, this split field design may be extended to include a third acceleration region. With a three stage split field acceleration region, a greater flexibility is achieved in the final kinetic energy of the ions and the position of the virtual object plane.

The invention is a specific design for an Orthogonal TOF mass spectrometer incorporating Einsel lens focusing, and a single stage grided reflector. Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

FIG. 2A is a depiction of the acceleration and analysis regions of a linear time-of-flight mass spectrometer according to a prior art Wiley-McLaren design;

FIG. 2B is a plot of electrostatic potential as a function of position within the spectrometer;

FIG. 5A is a depiction of the acceleration and analysis regions of a linear time-of-flight mass spectrometer according to a two stage split field acceleration interface of the present invention;

FIG. 5B is a plot of electrostatic potential as a function of position within a spectrometer including the two stage split field acceleration interface of the present invention;

FIG. 7A is a depiction of the acceleration and analysis regions of a linear time-of-flight mass spectrometer according to a three stage split field acceleration interface of the present invention; and FIG. 7B is a plot of electrostatic potential as a function of position within a spectrometer including the three stage split field acceleration interface of the present invention.

DETAILED DESCRIPTION OF THE PREFERRED EMBODIMENT

Figure 1A:
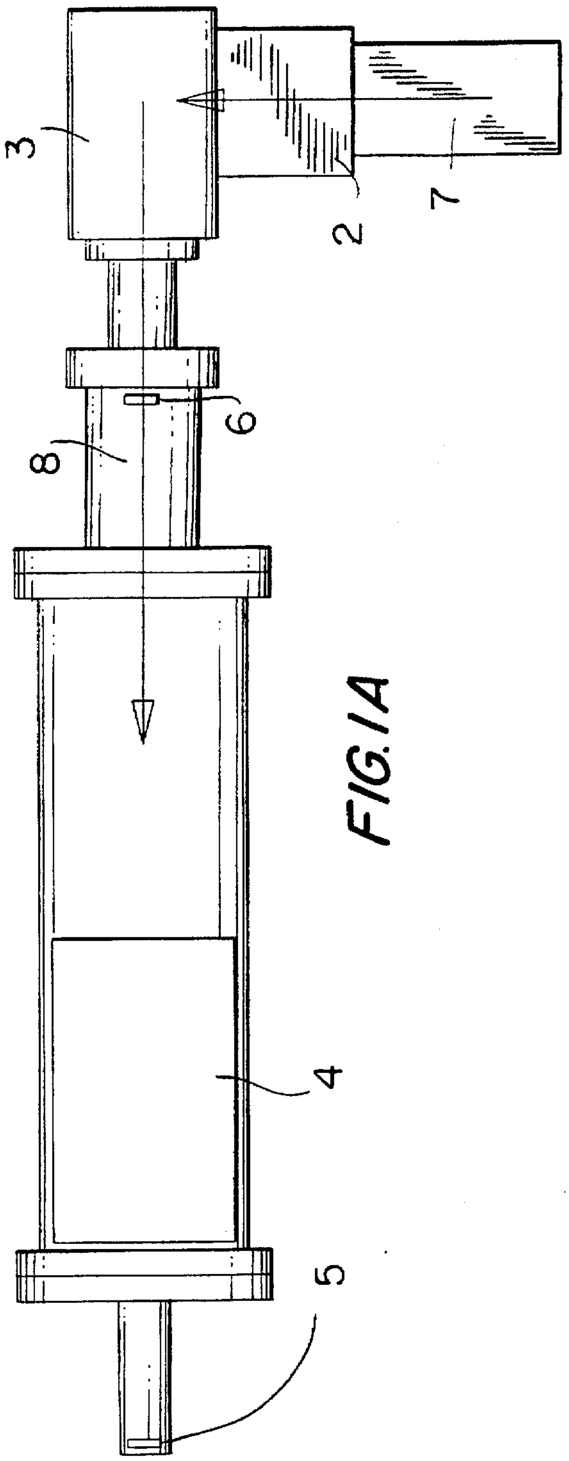
FIG. 1A is a schematic view of a prior art Orthogonal TOF mass spectrometer as seen from above.

With respect to FIG. 1A, a prior art TOFMS 1 is shown, with an ion source 2, interface 3, reflectron 4, linear detector 5, and reflector detector 6. In FIG. 1, ions are generated in the source 2 by, for example, electrospray ionization. Ions are accelerated through, and out of, the ion source 2 along path 7. In interface 3, the ions are accelerated in a direction which is orthogonal to their original direction of motion. After this acceleration, ions are deflected onto a trajectory 8 which is truly orthogonal to their original direction of motion given by path 7.

Figure 1B:
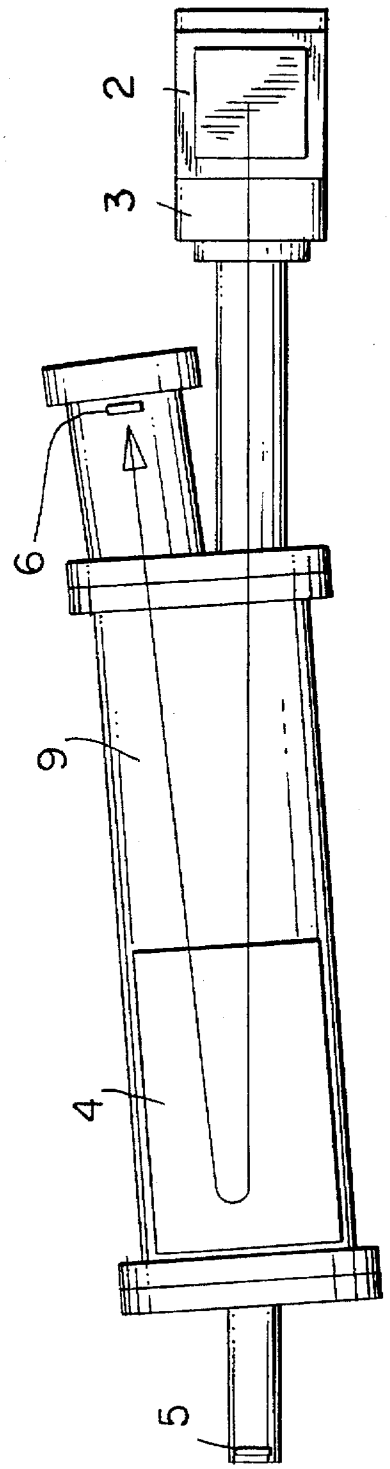
FIG. 1B is a schematic view of a prior art Orthogonal TOF mass spectrometer as seen from the side.

The TOF mass analysis takes place in a plane which is orthogonal to path 7. An example ion path 9 through the spectrometer in this plane is depicted in FIG. 1B. The TOF mass analysis begins in interface 3 where ions are accelerated by an electric field and deflected onto a proper trajectory. Ions pass out of the interface and drift through the spectrometer until arriving at reflectron 4. If the reflectron is deenergized, the ions will drift through the reflectron and strike detector 5. If the reflectron is energized, however, the ions will be reflected and eventually strike detector 6 according to path 9. By measuring the time required for the ions to move from their starting point in the interface to one of the detectors, the mass to charge ratio of the ions can be determined. The mass and relative abundance of the ions is determined by measuring the time required for the ions to travel from their starting point in the interface to one of the detectors and the signal intensity at the detectors respectively.

FIG. 2A is a depiction of the acceleration and analysis regions of a linear time-of-flight mass spectrometer according to a prior art Wiley-McLaren design. As depicted in FIG. 2A, electrode 10 is a solid metal disk and electrodes 12 and 13 are screens of metal wire. Position 11 is the average starting position of the ions. Position 14 is the position of the virtual object plane. The virtual object plane does riot exist as a physical entity but only as a place in which the ions are focused. Position 15 is the detection plane. This plane occurs at the surface of the detector. As depicted in FIG. 2A, the distance between electrodes 10 and 12 is given as $d_1$. The distance between electrodes 12 and 13 is given as $d_2$. The distance between average starting position 11 and electrode 12 is so. The distance, $d_v$, is the distance between electrode 13 and virtual object plane 14. And the distance, D, is the distance between electrode 13 and detection plane 15. Typical values for $d_1$, $d_2$, $s_o$, $d_v$, and D are 10 mm, 10 mm, 8 mm, 10 to 1600 mm, and 1600 mm.

At the beginning of the TOFMS analysis ions are at a variety of positions near average starting position 11, and electrodes 10, 12, and 13 are all at ground electrical potential. Electrodes 10 and 12 are simultaneously pulsed to some high voltage. As an example, the potential on electrode 10 might be changed from ground potential to 3000 V over about 100 ns. Simultaneously the potential on electrode 12 is changed from ground to 2800 V. Electrode 13 remains at ground potential. The potentials on electrodes 10, 12, and 13 generates an electric field between the electrodes and therefore a potential gradient as depicted in the plot of FIG. 2B. Ions are accelerated by the electric field toward the detection plane. Once beyond electrode 13, the ions experience no additional field gradient and therefore drift through the remainder of the spectrometer until colliding with the detector at detection plane 15.

$$k_o = \frac{s_o E_1 + d_2 E_2}{s_o E_1} \tag{4}$$

At some distance, $d_v$, from electrode 13, the ions pass through a virtual object plane. All ions of a given mass starting simultaneously from a position near position 11 will arrive at virtual object plane 14 simultaneously. The distance, $d_v$, can be adjusted via the distances $d_1$ and $d_2$, and the potentials placed on electrodes 12 and 13 according to the equation:

$$d_v = 2 s_o k_o^{\frac{3}{2}} \left( 1 - \frac{1}{k_o + k_o^{\frac{1}{2}}} \frac{d_2}{s_o} \right) \tag{5}$$

where $E_1$ is the electric field strength between electrodes 10 and 12 and $E_2$ is the electric field strength between electrodes 12 and 13. In a linear TOF mass spectrometer, it is desirable that dv equals D. In this way, all ions of a given mass to charge ratio will arrive at the detector at the same time. This has the effect of increasing the mass resolution of the instrument over what would otherwise be possible.

Figure 3:
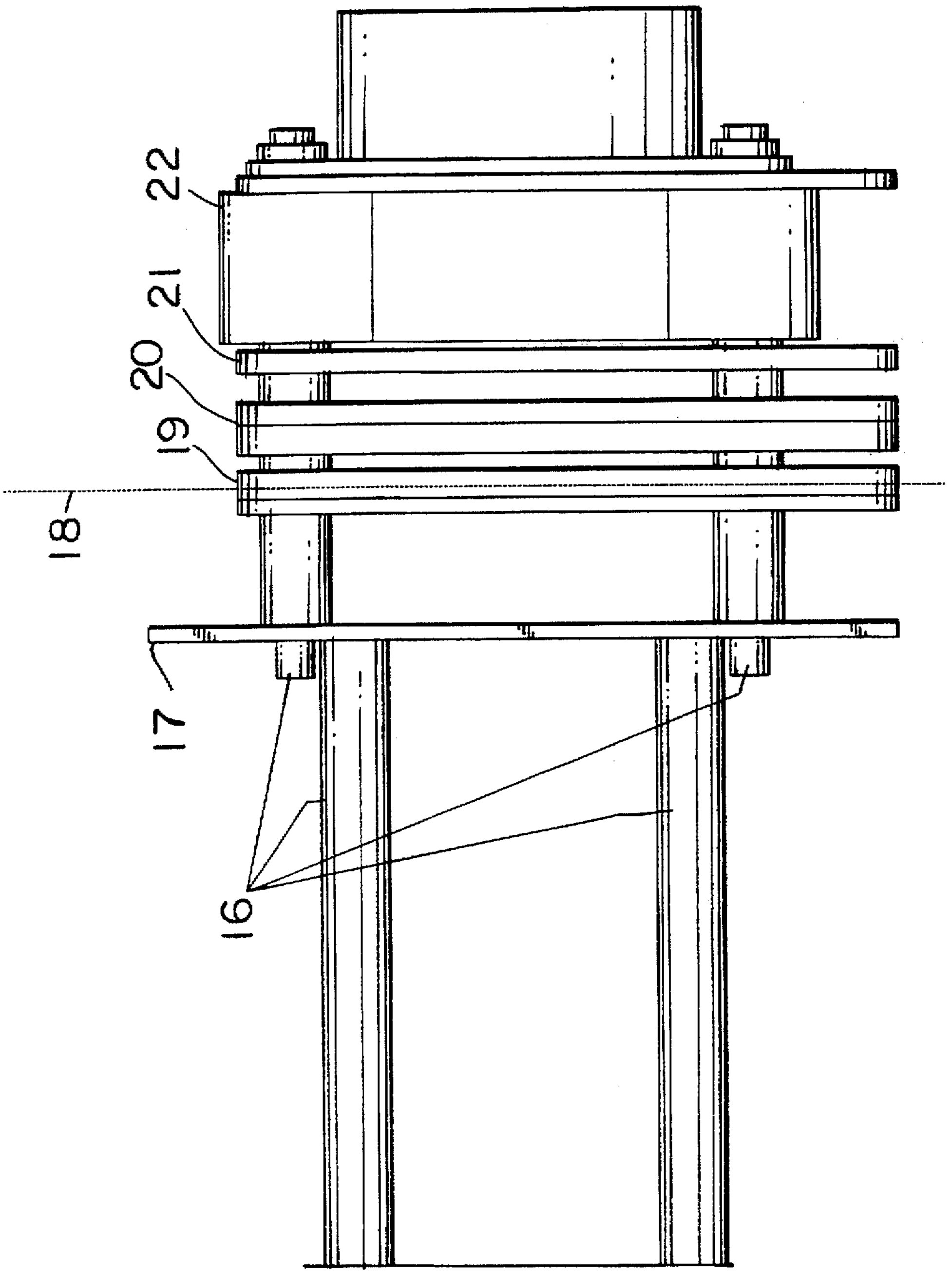
FIG. 3 is a diagram of the prior art Bruker orthogonal TOF interface including a two stage acceleration region according to the prior art Wiley-McLaren design.

FIG. 3 is a depiction of the prior art Bruker orthogonal TOF interface including support rods 16, baseplate 17, repeller 19, extraction grid 20, ground grid 21, and multideflector 22. When the repeller and extraction grid are at ground, ions generated in source 2 pass between the repeller and the extraction grid along path 18. At appropriate intervals, the repeller and extraction grid are pulsed to a high electrical potential. (i.e. 3000 V and 2800 V respectively). Ions between the repeller and extraction grid at the time of the pulse are accelerated in the orthogonal direction (i.e. orthogonal to path 18) by the electric field established by the potentials on electrodes 19, 20, and 21. Multideflector 22 deflects the ions so as to eliminate ion motion in the axial direction (i.e. in the dimension of path 18).

Figure 4:
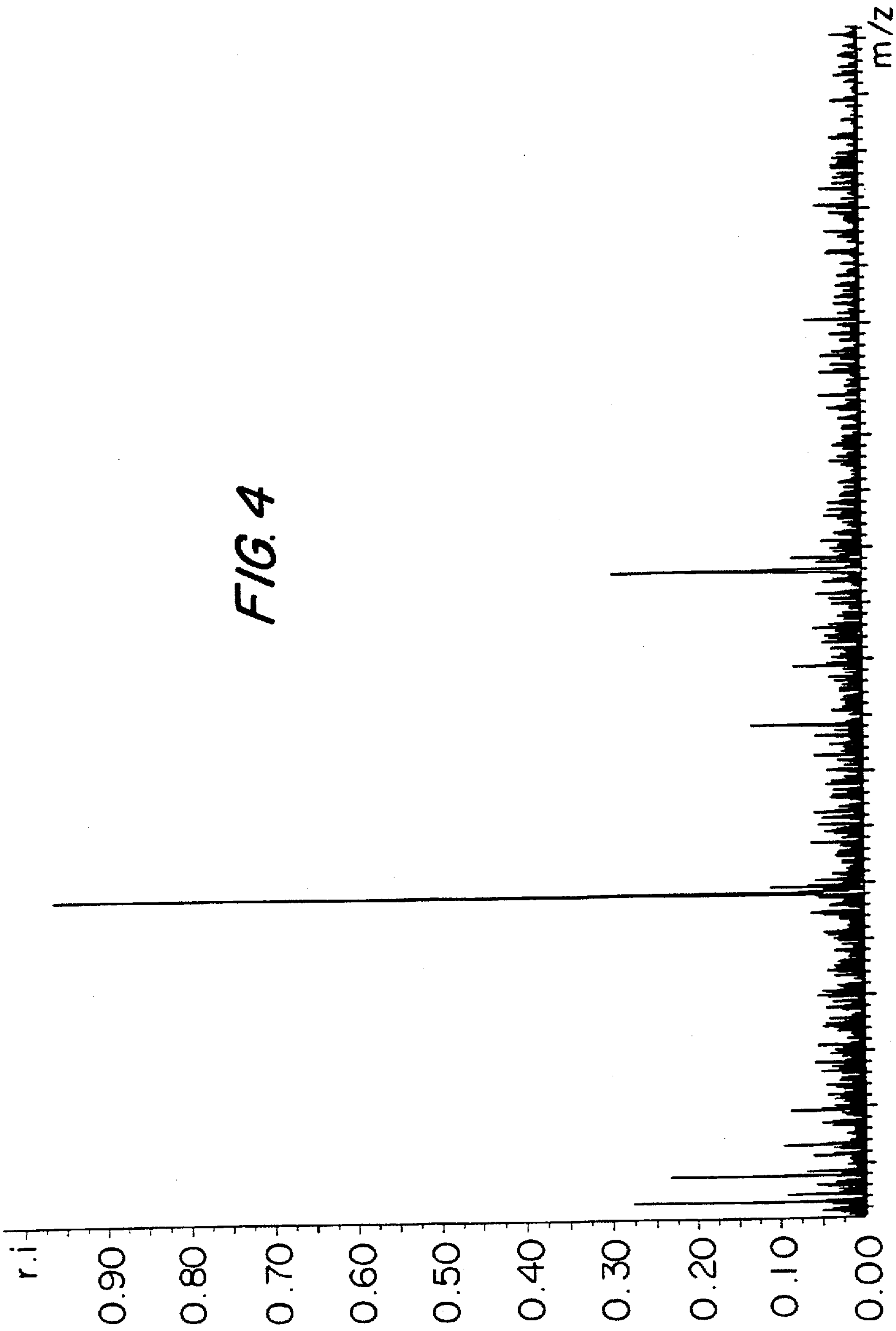
FIG. 4 is a mass spectrum of bradykinin as obtained with the prior art Bruker orthogonal TOF mass spectrometer.

FIG. 4 is a mass spectrum of bradykinin as obtained with the prior art Bruker orthogonal TOF mass spectrometer. The spectrum is a plot of relative signal intensity at detector 5 as a function of the ion mass-to-charge ratio. The ions represented in the spectrum are formed by placing one or more elemental charges on molecules of the bradykinin sample. The two most intense signals represented correspond to the doubly charged molecular ion (most intense signal) and the singly charge molecular ion (second most intense signal). Mass-to-charge ratios are determined by ion flight times as discussed above and in accordance with equations 2 and 3.

As an alternative to the potentials given above and in FIG. 2, the electrode 12 may be held at ground potential while repeller 10 is pulsed to a relatively low voltage (for example 200 V). In this case electrode 13 and all the devices occuring between electrode 13 and detection plane 15 would be held at a high negative potential (e.g. −2800 V). Under such circumstances, the multideflector discussed in FIG. 3 would have to be operated at −2800 V. Operating the multideflector at such potentials is inconvient because the small high frequency signal required to operate the multideflector would have to be added on top of the ion acceleration voltage. Thus, when using the prior art Wiley-McLaren design one has the inconvience of a high voltage pulse on electrodes 10 and 12 or a high voltage on the deflecting device.

Also, in some cases, it is desirable to form the virtual object plane close to electrode 13 (i.e. $d_2$–small). In such a case, one would typically adjust the electric field strengths, $E_1$ and $E_2$ in accordance with equations 4 and 5. However, this would require that $E_1$ and $E_2$ be of similar values. Thus, one would be required to apply relatively high voltage pulses to electrodes 10 and 12 (>3 kV) or accept a relatively low final ion kinetic energy (<3 keV). If one separates the two acceleration stages according to the present invention, then it would be possible to use relatively low pulse voltages on electrode 10 and still have a high final ion kinetic energy.

FIG. 5A is a depiction of the acceleration and analysis regions of a linear time-of-flight mass spectrometer according to a two stage split field interface of the present invention. This design contains all the electrodes discussed regarding FIG. 2A and additional electrode 23 which is placed between electrodes 12 and 13. Electrode 23 is a fine metal screen similar to electrodes 12 and 13. The distance d' represents the distance between elements 12 and 23.

For convenience, the potentials on the accelerating electrodes may be such that electrodes 12 and 23 are always at ground potential. In such a case, electrode 13 and the entire region between electrode 13 and detection plane 15 would be held at a negative potential (e.g. −3 kV) assuming positively charged ions were to be analyzed. Electrode 10 would be at ground potential most of the time, but at the beginning of the analysis would be pulsed up to about 200 V.

FIG. 5B is a plot of electrostatic potential as a function of position within a spectrometer including the two stage split field acceleration interface of the present invention as shown in FIG. 5A. The distance, $d_v$, in this case is given by:

$$d_v = 2s_o k_o^{\frac{3}{2}}\left(1 - \frac{1}{k_o + k_o^{\frac{1}{2}}}\,\frac{d_2}{s_o} - \frac{d'}{2s_o}\right);\ d' < 2s_o \tag{6}$$

$$d_v = 2s_o - (d_2 + d');\ d' \geqq 2s_o \tag{7}$$

Taking d'=0 reduces the split-field design back to the prior art Wiley-McLaren design and reduces equation 6 to equation 5. By choosing proper electrode potentials and interplate distances, the distance $d_v$ can be made small while maintaining a high final kinetic energy and a low pulse voltage. For example, if repeller 10 is pulsed up to 200 V, grids 12 and 23 are held at ground potential, grid 13 is held at −2800 V, and distances so, $d_1$, d', and $d_2$ are set to 9 mm, 10 mm, 15 mm, and 10 mm respectively, then the distance dv would be 137 mm. Under identical conditions, except with d'=0, equation 6 yields $d_v$=1147. Thus, under identical conditions, the split-field interface can produce a virtual object plane closer to the source than the Wiley-McLaren design.

With the proper selection of d', $d_v$ can be maintained at a small value regardless of the ion's final kinetic energy. For example, if d' is chosen to be $2s_o$, then according to equation 7, $d_v$ will be $-d_2$ regardless of the potentials placed on the electrodes or the ion's final kinetic energy.

Notice in FIGS. 5A and 5B, that a device may be placed between electrodes 12 and 23 without influencing the acceleration of the ions in the time-of-flight direction. The electrical operation of the device would be convenient because, as shown in FIG. 5B, the device would be at ground electrical potential. Further, note that because a split-field interface is used, the device can be placed closer to ion origin 11 than would otherwise be possible.

Figure 6:
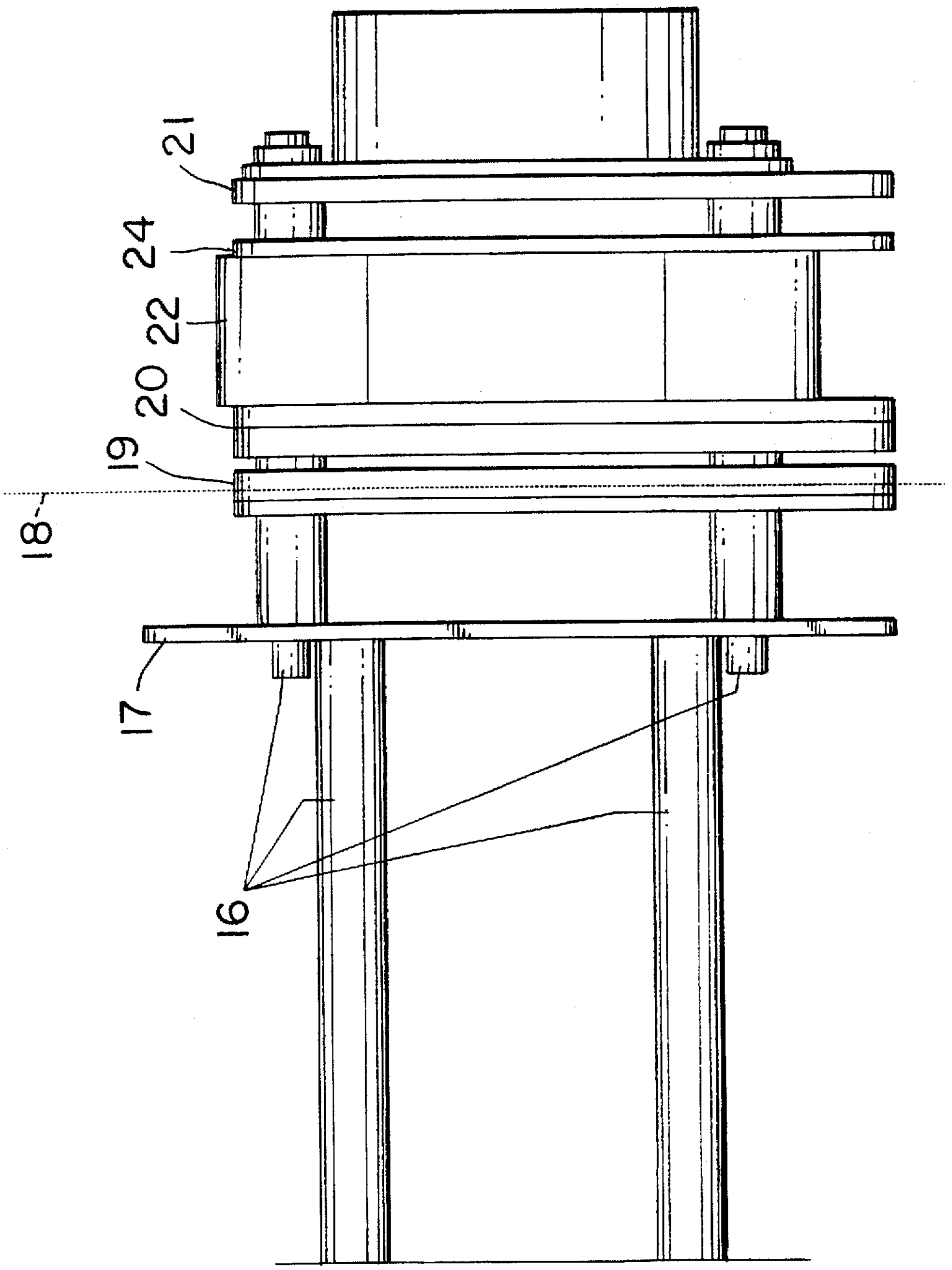
FIG. 6 is a diagram of the Bruker orthogonal TOF interface including a two stage split acceleration region according to the present invention.

FIG. 6 is a depiction of the Bruker split-field orthogonal TOF interface including support rods 16, baseplate 17, repeller 19, extraction grid 20, ground grid 21, multideflector 22, and second stage grid 24. Support rods 16 and baseplate 17 act only as mechanical supports for the device. Repeller 19 is prefereably a solid conducting plate with a rim of about 4 mm in height and a slot in the rim which passes ions travelling along path 18. Electrodes 20, 21 and 24 are composed of a conducting grid mounted on a metal holder. The conducting grid is typically fine mesh, for example, 90% transmission, 70 lines per inch, nickel grid. The support rods with which electrodes 19, 20, 21 and 24 are immediately in contact with are formed from insulating material such as poly (ethyl ether ketone). When the repeller and extraction grid are at ground, ions generated in source 2 pass between the repeller and the extraction grid along path 18. At appropriate intervals, the repeller is pulsed to an electrical potential of, for example, 200 V. Ions between the repeller and extraction grid at the time of the pulse are accelerated in the orthogonal direction (i.e. orthogonal to path 18) by the electric field established by the potentials on electrodes 19, 20, 21, and 24. Electrical potential on electrodes 20 and 24 are held at ground and the potential of electrode 21 is held at a high negative voltage as discussed above. Multideflector 22 deflects the ions so as to eliminate ion motion in the axial direction (i.e. in the dimension of path 18).

With the Bruker split-field orthogonal interface, one may accelerate ions to a high final kinetic energy, deflect the ions while they are still close to their starting position, and form a virtual object plane close to the ion's starting position. The virtual object plane must be formed close to the orthogonal interface in order to perform TOF mass analysis including a reflectron. This provides improved mass resolution.

FIG. 7A is a representation of the acceleration and analysis regions of a linear time-of-flight mass spectrometer according to a three stage split field acceleration interface of the present invention. This design contains all the electrodes discussed regarding FIG. 5A and additional electrode 25 which is placed between electrodes 10 and 12. Electrode 25 is a fine metal screen similar to electrodes 12, 13, and 23. The distance d" represents the distance between elements 25 and 12.

For convenience, the potentials on the accelerating electrodes may be such that electrodes 12 and 23 are always at ground potential. In such a case, electrode 13 and the entire region between electrode 13 and detection plane 15 would be held at a negative potential (e.g. −3 kV) assuming positively charged ions were to be analyzed. Electrode 10 would be at ground potential most of the time, but at the beginning of the analysis would be pulsed up to about 300 V. Electrode 25 would also be at ground potential most of time, and would be pulsed to, for example, 200 V simultaneous with the pulsing of electrode 10.

FIG. 7B is a plot of electrostatic potential as a function of position within a spectrometer including the three stage split field acceleration interface of the present invention as shown in FIG. 7A. As with the two stage split field interface, by choosing proper electrode potentials and interplate distances, the distance $d_v$ can be made small while maintaining a high final kinetic energy and a low pulse voltage. Furthermore, even if distances $d_1$, $d_2$, d', and d" are set, $d_v$ can be adjusted without changing the final kinetic energy of the ions by adjusting the potential on electrode 25.

When operating the spectrometer in linear mode, the potential on electrode 25 is nearly as high as the potential on electrode 10 such that d, is approximately equal D. Alternatively, when operating the spectrometer in reflectron mode, the potential on electrode 25 is set to a value much lower than that on electrode 10 so that $d_v$ is near or less than zero. This change in $d_v$ is achieved without changing the final kinetic energy of the ions.

As in the two stage split field interfaces, a device may be placed between electrodes 12 and 23 of the three stage split field interface without influencing the acceleration of the ions in the time-of-flight direction. The electrical operation of the device would be convenient because, as shown in FIG. 7B, the device would be at ground electrical potential. Again, because a split-field interface is used, the device can be placed closer to ion origin 11 than would otherwise be possible.

While the foregoing embodiments of the invention have been set forth in considerable detail for the purposes of making a complete disclosure of the invention, it will be apparent to those of skill in the art that numerous changes may be made in such details without departing from the spirit and the principles of the invention.

I claim:

1. A split-field ion interface for a time of flight mass spectrometer comprising:

a multideflector;

a first electrode energized to a first potential;

a second electrode energized to a second potential;

a third electrode energized to a third potential, wherein said multideflector and said first, second and third electrodes form said interface between an ion source and said mass spectrometer; and at least one electrode gap, defined as the region between two of said first, second and third electrodes, wherein ions are propelled through said gap;

wherein said interface is situated such that ions are accelerated in a direction parallel to the flight tube of said mass spectrometer.

2. A split-field ion interface according to claim 1 wherein at least one of said electrodes is energized to a negative potential.

3. A split-field ion interface according to claim 1 wherein at least one of said electrodes is energized to a positive potential.

4. A split-field ion interface according to claim 1 wherein at least one of said electrodes is grounded.

5. A split-field ion interface according to claim 1 wherein said electrodes are planar and wherein said ions are formed in proximity to a common plane and are propagated along an ion beam path.

6. A split-field ion interface according to claim 1 wherein said interface includes means for producing ions.

7. A split-field ion interface according to claim 6 wherein said means for producing ions is located within said gap.

8. A split-field ion interface according to claim 1 wherein said electrodes are conducting planar surfaces.

9. A split-field ion interface according to claim 8 wherein said conducting planar surfaces are aligned in parallel.

10. A split-field ion interface according to claim 1 wherein said interface further comprises a fourth electrode energized to at least one of said first, second or third potentials.

11. A split-field ion interface according to claim 10 wherein said interface further comprises a fifth electrode energized to a fourth potential.

12. A split-field ion interface for use in a time of flight mass spectrometer comprising:

support rods connected to a baseplate;

a repeller connected to said support rods;

an extraction grid connected to said support rods and located adjacent to said repeller;

a ground grid connected to said support rods;

a second stage grid connected to said support rods, and situated between a multideflector and said ground grid; and at least one electrode gap, defined as the region between said repeller and said extraction grid, or between said extraction grid and said second stage grid, or between said second stage grid or said around grid, wherein said ions are propelled through said electrode gap;

wherein said repeller is energized so that ions located between said repeller and said extraction grid are accelerated along an ion beam path, wherein said multideflector is situated between said extraction grid and said ground grid and wherein said interface is situated such that ions are accelerated in a direction parallel to the flight tube of said mass spectrometer.

13. An ion source according to claim 12 wherein one of said grids is energized to a negative potential.

14. An ion source according to claim 12 wherein said ground grid is held to ground, and said repeller is grounded.

15. An ion source according to claim 12 wherein a planar gap is formed between said baseplate and said ground grid.

16. A split-field interface for a time of flight mass spectrometer comprising:

a first electrode energized to a first potential;

a second electrode energized to a second potential;

a third electrode energized to said second potential;

a fourth electrode energized to a third potential;

wherein a first gap is formed between said first and second electrodes, a second gap is formed between said second and third electrodes and a third gap is formed between said third and fourth electrodes, wherein said gaps accelerate or decelerate ions propagated along an ion beam path, and wherein said interface is situated such that ions are accelerated in a direction parallel to the flight tube of said mass spectrometer.

17. An interface according to claim 16 wherein at least one of said electrodes is energized to a negative potential.

18. An interface according to claim 16 wherein at least one of said electrodes is energized to at positive potential.

19. An interface according to claim 16 wherein at least one of said electrodes is grounded.

* * * * *